United States Patent
Chung (10) Patent No.: US 10,257,885 B2
(45) Date of Patent: Apr. 9, 2019

(54) ENERGY-SAVING HEATING WEARABLE APPARATUS

(71) Applicant: CARMMING INTERNATIONAL, New Taipei (TW)

(72) Inventor: Kuo-Hua Chung, New Taipei (TW)

(73) Assignee: CARMMING INTERNATIONAL, New Taipei (TW)

( * ) Notice: Subject to any disclaimer, the term of this patent is extended or adjusted under 35 U.S.C. 154(b) by 56 days.

(21) Appl. No.: 15/616,924

(22) Filed: Jun. 8, 2017

(65) Prior Publication Data

US 2018/0359812 A1  Dec. 13, 2018

(51) Int. Cl.
*H05B 1/02* (2006.01)
*A41D 19/015* (2006.01)
(Continued)

(52) U.S. Cl.
CPC ..... *H05B 1/0272* (2013.01); *A41D 19/01535* (2013.01); *A41D 19/01594* (2013.01);
(Continued)

(58) Field of Classification Search
CPC .......... H05B 1/02; H05B 1/0272; H05B 3/12; H05B 3/347; H05B 2203/015; H05B 2203/02; H05B 2203/036; H01M 10/44; H01M 2010/4271; H01M 2220/30; A41D 19/01535; A41D 19/01594
(Continued)

(56) References Cited

U.S. PATENT DOCUMENTS 1,691,472 A * 11/1928 Graham ............. A41D 13/0051
                                              2/159
5,063,924 A * 11/1991 Galvan ................... A61G 1/00
                                              128/200.24
(Continued)

FOREIGN PATENT DOCUMENTS

| CN | 204169106 U | 2/2015 |
| EP | 2682504 A1 | 1/2014 |
| TW | M532704 U | 11/2016 |

OTHER PUBLICATIONS

Search Report dated Aug. 2, 2018 of the corresponding European patent application No. 18151264.1.

*Primary Examiner* — Mark H Paschall
(74) *Attorney, Agent, or Firm* — Chun-Ming Shih; HDLS IPR Services (57) ABSTRACT

An energy-saving heating wearable apparatus mainly includes a control unit, a heating unit, a temperature sensing unit, and a humidity sensing unit. The control unit controls the heating unit to continuously heat when an ambient temperature or a biological body temperature detected by the temperature sensing unit is less than a temperature setting value. The control unit controls the heating unit to stop heating when the ambient temperature or the biological body temperature is not less than the temperature setting value. The control unit controls the heating unit to stop heating when an ambient humidity or a biological body humidity detected by the humidity sensing unit is less than a humidity setting value. The control unit controls the heating unit to continuously heat when the ambient humidity or the biological body humidity is not less than the humidity setting value.

16 Claims, 5 Drawing Sheets

(51) Int. Cl.
*H05B 3/12* (2006.01)
*H05B 3/34* (2006.01)
*H01M 10/44* (2006.01)
*H01M 10/42* (2006.01)

(52) U.S. Cl.
CPC .............. *H01M 10/44* (2013.01); *H05B 3/12* (2013.01); *H05B 3/347* (2013.01); *H01M 2010/4271* (2013.01); *H01M 2220/30* (2013.01); *H05B 2203/015* (2013.01); *H05B 2203/02* (2013.01); *H05B 2203/036* (2013.01)

(58) Field of Classification Search
USPC ........ 219/505, 491, 506, 497, 494, 209, 210
See application file for complete search history.

(56) References Cited

U.S. PATENT DOCUMENTS

| | | | | |
|---|---|---|---|---|
| 5,148,002 | A * | 9/1992 | Kuo | H01Q 1/273 |
| | | | | 219/211 |
| 7,618,736 | B2 * | 11/2009 | Shen | H01M 2/266 |
| | | | | 429/161 |
| 8,779,331 | B2 * | 7/2014 | Rothschild | H05B 1/0227 |
| | | | | 219/209 |
| 2001/0002669 | A1 | 6/2001 | Kochman et al. | |
| 2008/0189826 | A1 | 8/2008 | Dilli | |
| 2009/0289046 | A1 | 11/2009 | Richmond | |
| 2012/0069552 | A1 | 3/2012 | Richard | |
| 2014/0353300 | A1 | 12/2014 | Swiatek et al. | |
| 2017/0086513 | A1 | 3/2017 | Maxey et al. | |
| 2017/0339773 | A1 | 11/2017 | Chen | |

\* cited by examiner

ENERGY-SAVING HEATING WEARABLE APPARATUS

BACKGROUND

Technical Field

The present invention relates to a heating apparatus, and more particularly to an energy-saving heating wearable apparatus for a person who wears the energy-saving heating wearable apparatus to sense an ambient temperature, an ambient humidity, a body temperature of the person, and a body humidity of the person.

Description of Related Art

In response to cold or snow climate, wearable apparatuses, such as gloves, socks, or scarves with heating mechanisms are used to provide heat sources to help users keep warm. The heating mechanism usually uses a lithium-ion battery and heating elements electrically connected to the lithium-ion battery to generate heat from the heating elements supplied power by the lithium-ion battery.

However, the lithium-ion battery cannot be installed to close to the heating elements due to the problem of manufacturing materials of the lithium-ion battery. In other words, it is usually to maintain a certain safe distance or be isolated between the lithium-ion battery and the heating elements so as to protect the lithium-ion battery, thereby causing disadvantages of excessive installation space, complicated assembly manners, and decentralized heat sources.

SUMMARY

An objective of the present invention is to provide a lithium ceramic battery which is not affected by high temperature and is not exploded due to no violent chemical reaction, and a high specific-heat cladding layer is used to be a radiant heat reflective layer to maintain temperature and reduce power consumption by smart controls.

Another objective of the present invention is to provide the lithium ceramic battery to increase the use time and reduce the volume thereof so as to be conveniently applied to a wearable apparatus.

In order to achieve the above-mentioned objectives, the present invention provides an energy-saving heating wearable apparatus. The energy-saving heating wearable apparatus is installed in a wearable body and the energy-saving heating wearable apparatus includes a control unit, an explosion-proof power supply unit, a power management unit, a heating unit, a display unit, an input unit, a temperature sensing unit, and a humidity sensing unit. The control unit stores an application program for temperature and humidity determinations. The explosion-proof power supply unit provides the required power to the energy-saving heating wearable apparatus. The power management unit is electrically connected to the control unit and the explosion-proof power supply unit, and the power management unit manages the power of the explosion-proof power supply unit. The heating unit is electrically connected to the control unit and the power management unit. The display unit is electrically connected to the control unit, and the display unit displays control states of the energy-saving heating wearable apparatus. The input unit is electrically connected to the control unit, and the input unit provides operation signals to the control unit. The temperature sensing unit is electrically connected to the control unit, and the temperature sensing unit senses a biological body temperature and an ambient temperature. The humidity sensing unit is electrically connected to the control unit, and the humidity sensing unit senses a biological body humidity and an ambient humidity. When the biological body temperature is less than a first temperature setting value or the ambient temperature is less than a second temperature setting value, the control unit is configured to control the heating unit to continuously heat; when the biological body temperature is not less than the first temperature setting value and the ambient temperature is not less than the second temperature setting value, the control unit is configured to control the heating unit to stop heating; when the biological body humidity is less than a humidity setting value or the ambient humidity is less than the humidity setting value, the control unit is configured to control the heating unit to stop heating; when the biological body humidity is not less than the humidity setting value and the ambient humidity is not less than the humidity setting value, the control unit is configured to control the heating unit to continuously heat.

In one embodiment, the control unit is a microcontroller.

In one embodiment, the explosion-proof power supply unit includes a separable explosion-proof chargeable battery and a high specific-heat cladding layer. The high specific-heat cladding layer is arranged at one side of the separable explosion-proof chargeable battery, and arranged at one side of the heating unit.

In one embodiment, the high specific-heat cladding layer is a ceramic yarn or a nylon yarn.

In one embodiment, the power management unit includes a charging circuit. The charging circuit charges the explosion-proof power supply unit by an external power through the power management unit.

In one embodiment, the heating unit is a heating layer, and the heating layer is a woven wire cloth composed of iron, steel, or copper materials, polyimide film electric heating piece, or ceramic heating piece positive temperature coefficient.

In one embodiment, the display unit is an LCD display screen or an LED display screen.

In one embodiment, the input unit includes a touch switch, a time switch, and a temperature switch.

In one embodiment, the temperature sensing unit includes a biological body temperature sensor and an ambient temperature sensor.

In one embodiment, the humidity sensing unit includes a biological body humidity sensor and an ambient humidity sensor.

In one embodiment, the first temperature setting value is 30 degrees.

In one embodiment, the second temperature setting value is 15 degrees.

In one embodiment, the humidity setting value is 60%.

In one embodiment, the explosion-proof chargeable battery, the high specific-heat cladding layer, and the heating unit are arranged in stack inside an inner layer of the wearable body; the control unit, the power management unit, the display unit, the input unit, the temperature sensing unit, and the humidity sensing unit of the energy-saving heating wearable apparatus are integrated on a flexible printed circuit board; the flexible printed circuit board is installed inside the inner layer of the wearable body, and the temperature sensing unit and the humidity sensing unit are exposed to the ambient environment and the biological body.

In one embodiment, the flexible printed circuit board further provides a USB connector; the USB connector is electrically connected to the circuit board and the power management unit, and the USB connector has a USB adaptor and an extended transmission line, and the USB adaptor is connected at an end terminal of the extended transmission line; the USB connector is externally connected with a charger adaptor.

In one embodiment, the energy-saving heating wearable apparatus further includes a wireless communication unit. The a wireless communication unit is electrically connected to the control unit, and the wireless communication unit is externally communicated with a wireless communication apparatus and downloads climate prediction information and provides the climate prediction information to the control unit for determining temperature controls.

In one embodiment, the wireless communication unit is externally coupled to a wireless control light unit and is configured to perform a light activation mode; the input unit is provided to be a switch for controls.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWING

The present invention can be more fully understood by reading the following detailed description of the embodiment, with reference made to the accompanying drawings as follows.

DETAILED DESCRIPTION

Reference will now be made to the drawing figures to describe the present invention in detail. It will be understood that the drawing figures and exemplified embodiments of present invention are not limited to the details thereof.

Figure 1:
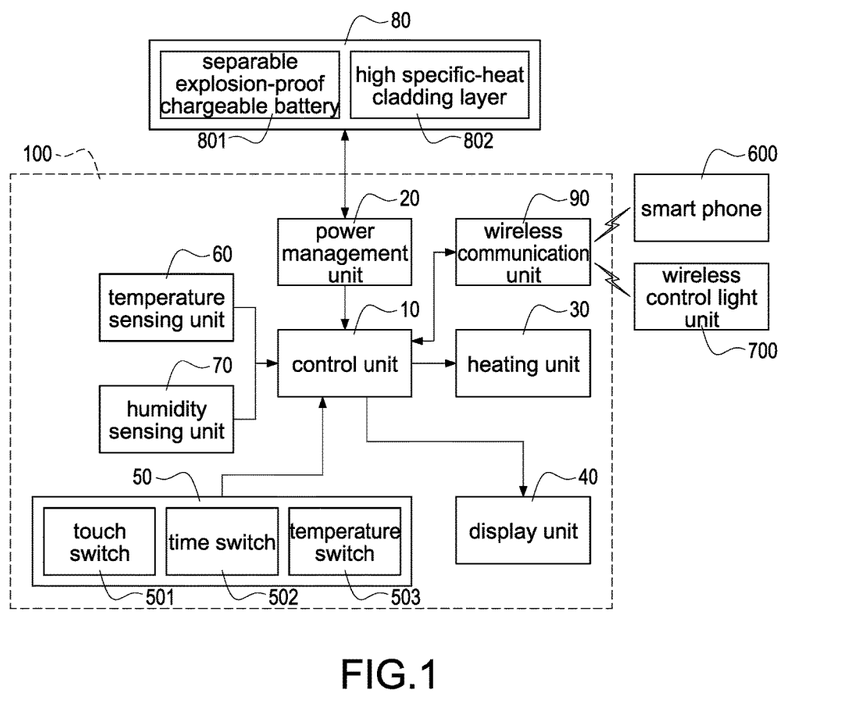
FIG. 1 shows a schematic circuit block diagram of an energy-saving heating wearable apparatus according to the present invention.

Refer to FIG. 1, which shows a schematic circuit block diagram of an energy-saving heating wearable apparatus according to the present invention. The energy-saving heating wearable apparatus 100 includes a control unit 10, a power management unit 20, a heating unit 30, a display unit 40, an input unit 50, a temperature sensing unit 60, a humidity sensing unit 70, an explosion-proof power supply unit 80, and a wireless communication unit 90. The temperature sensing unit 60 is provided to sense a biological body temperature and an ambient temperature. The humidity sensing unit 70 is provided to sense a biological body humidity and an ambient humidity. The control unit 10 determines whether the heating unit 30 needs to be activated to heat according to the sensed biological body temperature, ambient temperature, biological body humidity, and ambient humidity. If the biological body temperature or the ambient temperature is less than a temperature setting value, or the biological body humidity or the ambient humidity is not less than a humidity setting value, the control unit 10 controls the heating unit 30 to continuously heat.

The control unit 10 stores an application program for determining the sensed biological body temperature, ambient temperature, biological body humidity, and ambient humidity. In this embodiment, the control unit 10 is a microcontroller.

The power management unit 20 is electrically connected to the control unit 10 and the explosion-proof power supply unit 80 to provide a power management for the explosion-proof power supply unit 80, and provide the required power for the energy-saving heating wearable apparatus 100 and the heating unit 30. In this embodiment, the power management unit 20 includes a charging circuit (not shown) to charge a separable explosion-proof chargeable battery 801 of the explosion-proof power supply unit 80.

The heating unit 30 is electrically connected to the control unit 10 and the power management unit 20, and the control unit 10 activates the heating unit 30 to heat. In this embodiment, the heating unit 30 is a heating layer, and the heating layer is, for example but not limited to, a woven wire cloth composed of iron, steel, or copper materials, polyimide film electric heating piece, or ceramic heating piece positive temperature coefficient. The heating unit 30 is electrically connected to the power management unit 20 and attached on an inner layer of a wearable body (not shown).

The display unit 40 is electrically connected to the control unit 10 for displaying activation states, such as quantity of electricity, temperature, setting time, or so on. In this embodiment, the display unit 40 is an LCD or LED display screen.

The input unit 50 is electrically connected to the control unit 10 for providing operation signals to the control unit 10 so that the control unit 10 controls the energy-saving heating wearable apparatus 100 in activation (power on), time setting, temperature setting, power off. In this embodiment, the input unit 50 includes a touch switch (or touch button) 501, a time switch 502, and a temperature switch 503. The touch switch 501 is touched to power on and power off the energy-saving heating wearable apparatus 100. After the time switch 502 is turned on, the energy-saving heating wearable apparatus 100 is operated for a setting time, such as 0.5 hours, 1 hour, or 2 hours. After the temperature switch 503 is turned on, the heating unit 30 is controlled in a constant temperature state by the control unit 10.

The temperature sensing unit 60 is electrically connected to the control unit 10 to sense a biological body temperature and an ambient temperature. The biological body temperature and the ambient temperature sensed by the temperature sensing unit 60 are transmitted to the control unit 10 so as to determine whether the control unit 10 should activate the heating unit 30 or not. In this embodiment, the temperature sensing unit 60 includes a biological body temperature sensor and an ambient temperature sensor.

The humidity sensing unit 70 is electrically connected to the control unit 10 to sense a biological body humidity and an ambient humidity. The biological body humidity and the ambient humidity sensed by the humidity sensing unit 70 are transmitted to the control unit 10 so as to determine whether the control unit 10 should activate the heating unit 30 or not. In this embodiment, the humidity sensing unit 70 includes a biological body humidity sensor and an ambient humidity sensor.

The explosion-proof power supply unit 80 is electrically connected to the power management unit 20. The explosion-proof power supply unit 80 includes a separable explosion-proof chargeable battery 801 and a high specific-heat cladding layer 802 arranged at one side of the separable explosion-proof chargeable battery 801. The high specific-heat cladding layer 802 is further arranged at one side of the heating unit 30 and is used to be a regenerative chamber to absorb radiant heat generated from the heating unit 30 so that the wearable body has advantages of reduced installation space, simple assembly manner, reduced power consumption, high save energy, and concentrated heat source. In this embodiment, the high specific-heat cladding layer 802 is a ceramic yarn or a nylon yarn. The specific heat of the ceramic yarn is approximately 840 J/(kg·K) and the specific heat of the nylon yarn is approximately 1700 J/(kg·K) so that the ceramic yarn and the nylon yarn are continuously heated to emit radiant heat.

The wireless communication unit 90 is electrically connected to the control unit 10 and communicates with an external wireless communication apparatus, such as a smart phone 600 or a wireless control light unit 700. External climate prediction information stored in a cloud server can be downloaded by the smart phone 600 to be utilized for determining temperature controls by the control unit 10. In addition, the wireless communication unit 90 is communicated with the wireless control light unit 700 to perform a light activation mode so that the input unit 50 with buttons or switches of a glove (not shown) is used for controls of a directional light.

At the activated initiation of circuits of the energy-saving heating wearable apparatus 100, the temperature of the separable explosion-proof chargeable battery 801 is low so that the control unit 10 activates the heating unit 30 to directly heat the biological body and simultaneously heat the high specific-heat cladding layer 802.

When the circuits is activated for a period of time, the high specific-heat cladding layer 802 is heated to a high temperature to emit radiant heat. Also, the emitted radiant heat is provided to heat the biological body again to raise the temperature of the biological body. When the biological body temperature is greater than a predetermined temperature value, the control unit 10 controls the heating unit 30 to stop heating. At this time, the biological body temperature is maintained by the radiant heat emitted from the high specific-heat cladding layer 802 to achieve energy conservation.

Figure 2:
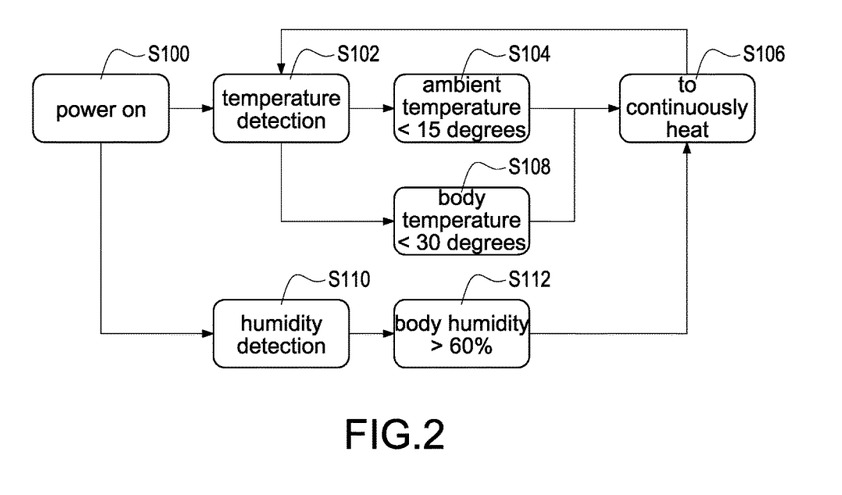
FIG. 2 shows a schematic control diagram of the energy-saving heating wearable apparatus activated at initiation according to the present invention.

Refer to FIG. 2, which shows a schematic control diagram of the energy-saving heating wearable apparatus activated at initiation according to the present invention. With reference also to FIG. 1, in step S100, a power source is turned on. The input unit 50 is operated to provide a signal to the control unit 10 so that the power management unit 20 supplied the power source to units of the energy-saving heating wearable apparatus 100.

In step S102, a biological body temperature and an ambient temperature are detected. The control unit 10 activates a temperature sensing unit 60 to sense the biological body temperature and the ambient temperature. In this embodiment, the biological body temperature may be a temperature of the user's hand, foot, face, body, or neck.

In step S104, it is to determine whether an ambient temperature is less than 15 degrees. The ambient temperature detected by the temperature sensing unit 60 is transmitted to the control unit 10. When the control unit 10 detects that the ambient temperature is less than 15 degrees, step S106 is performed.

In step S106, it is to continuously heat. When the ambient temperature detected by the temperature sensing unit 60 is less than 15 degrees, the control unit 10 controls the heating unit 30 to continuously heat.

In step S108, it is to determine whether a biological body temperature is less than 30 degrees. The biological body temperature detected by the temperature sensing unit 60 is transmitted to the control unit 10. When the control unit 10 detects that the biological body temperature is less than 30 degrees, step S106 is performed to continuously heat.

In step S110, a biological body humidity is detected. After the power source is turned on, the biological body humidity is simultaneously determined by the humidity sensing unit 70, and then step S112 is performed.

In step S112, it is to determine whether the biological body humidity is greater than 60%. When the humidity sensing unit 70 detects that the biological body humidity is greater than 60%, step S106 is performed.

Figure 3:
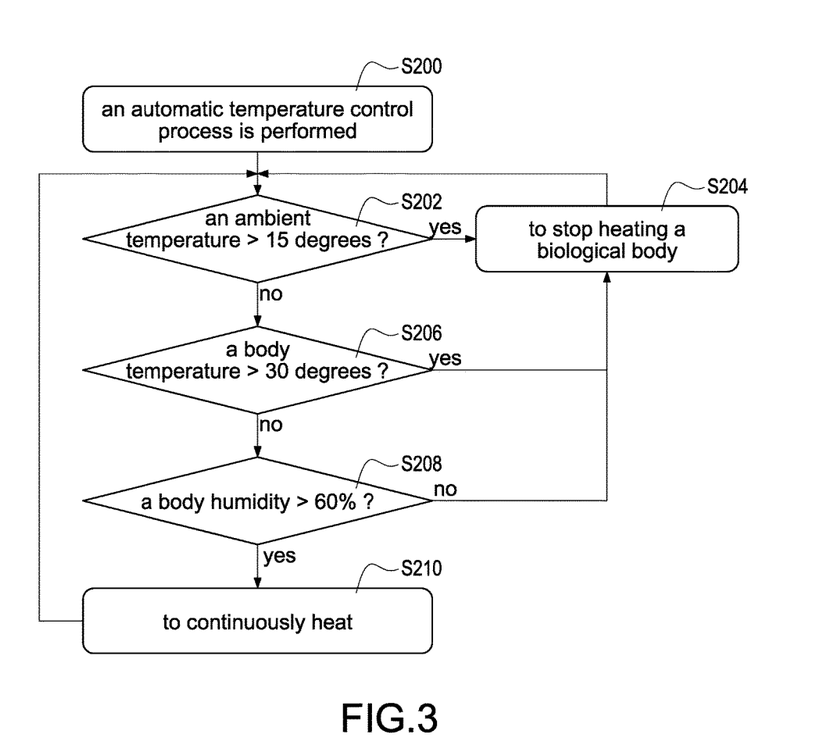
FIG. 3 shows a flowchart of automatic heating controls for the energy-saving heating wearable apparatus according to the present invention.

Refer to FIG. 3, which shows a flowchart of automatic heating controls for the energy-saving heating wearable apparatus according to the present invention. With reference also to FIG. 1, in step S200, an automatic temperature control process is performed. The temperature sensing unit 60 and the humidity sensing unit 70 are used for a temperature detection and a humidity detection, respectively.

In step S202, it is to determine whether the ambient temperature is greater than 15 degrees. When the control unit 10 determines that the ambient temperature detected by the temperature sensing unit 60 is greater than 15 degrees, step S204 is performed to stop heating the biological body so that the control unit 10 turns off the heating unit 30. In step S202, when the control unit 10 determines that the ambient temperature is not greater than 15 degrees, step S206 is performed.

In step S206, it is to determine whether the biological body temperature is greater than 30 degrees. When the control unit 10 determines that the biological body temperature detected by the temperature sensing unit 60 is greater than 30 degrees, step S204 is performed to stop heating the biological body so that the control unit 10 turns off the heating unit 30. At this time, the biological body temperature is maintained by the radiant heat emitted from the high specific-heat cladding layer 802 to achieve energy conservation. In this embodiment, the biological body temperature may be a temperature of the user's hand, foot, face, body, or neck. In step S206, when the control unit 10 determines that the biological body temperature is not greater than 30 degrees, step S208 is performed.

In step S208, it is to determine whether the biological body humidity is greater than 60%. When the control unit 10 determines that the biological body humidity detected by the humidity sensing unit 70 is greater than 60%, step S210 is performed to control the heating unit 30 continuously to heat by the control unit 10. In this embodiment, the biological body humidity may be a humidity of the user's hand, foot, face, body, or neck. In step S208, when the control unit 10 determines that the biological body humidity is not greater than 60%, step S204 is performed to stop heating the biological bod.

In step S210, it is to continuously heat. When the detected ambient temperature in step S202 is not greater than 15 degrees, the detected biological body temperature in step S206 is not greater than 30 degrees, or the detected biological body humidity in step S208 is greater than 60%, the control unit 10 continuously activates the heating unit 30 to heat.

Figure 4:
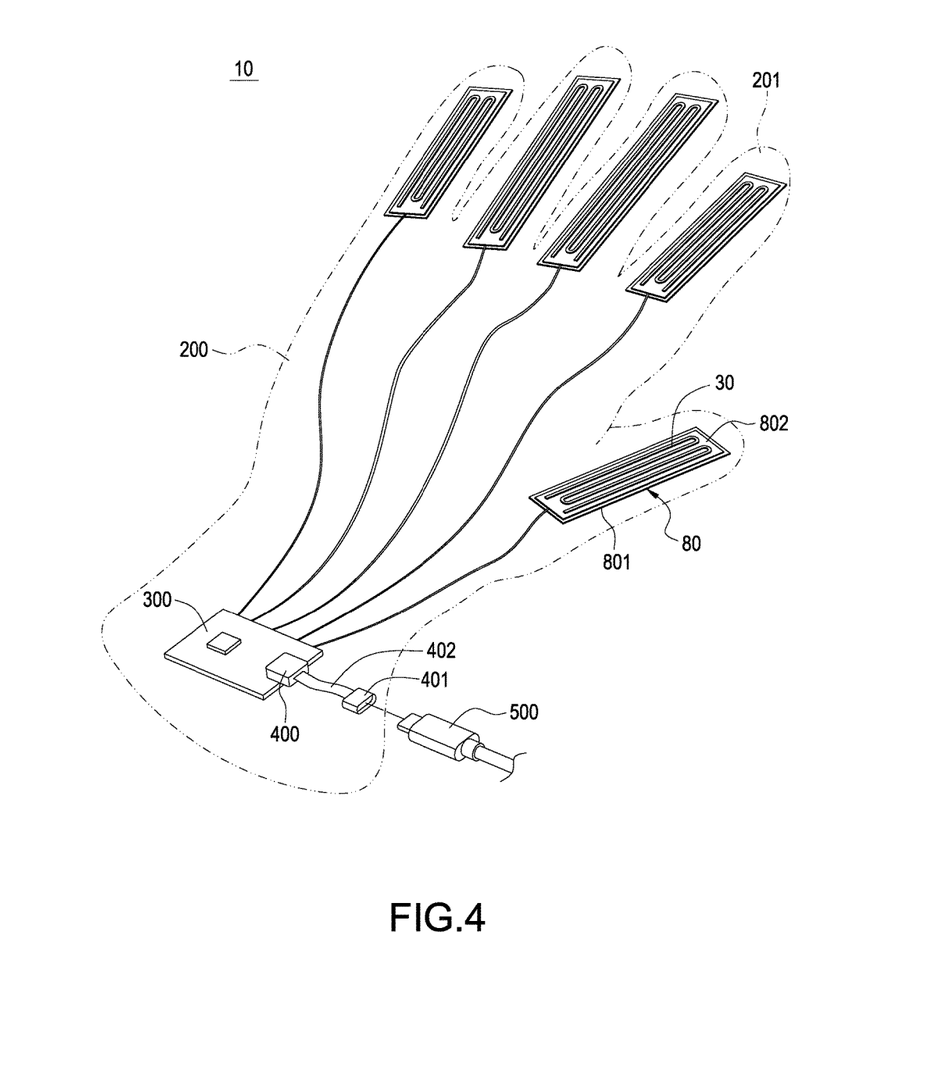
FIG. 4 shows a schematic view of using the energy-saving heating wearable apparatus according to the present invention.
Figure 5:
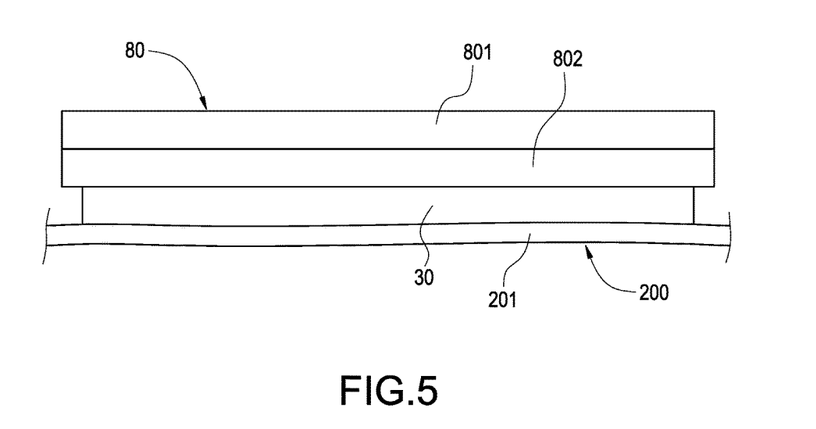
FIG. 5 shows a schematic partial side view in FIG. 4.

Refer to FIG. 4 and FIG. 5, which show a schematic view of using the energy-saving heating wearable apparatus according to the present invention and a schematic partial side view in FIG. 4, respectively. With reference also to FIG. 1, the separable explosion-proof chargeable battery 801, the high specific-heat cladding layer 802, and the heating unit 30 are arranged in stack inside an inner layer 201 of a wearable body 200, such as a glove. In addition, the control unit 10, the power management unit 20, the display unit 40, the input unit 50, the temperature sensing unit 60, and the humidity sensing unit 70 of the energy-saving heating wearable apparatus 100 shown in FIG. 1 are integrated on a circuit board 300, such as a flexible printed circuit board. The circuit board 300 is installed inside the inner layer 201 of the wearable body 200. The temperature sensing unit 60 and the humidity sensing unit 70 are exposed to the ambient environment and the biological body.

In addition, a USB connector 400 is electrically connected to the circuit board 300 and the power management unit 20. The USB connector 400 has a USB adaptor 401 and an extended transmission line 402, and the USB adaptor 401 is connected at an end terminal of the extended transmission line 402. The USB connector 400 is used to externally connect with a charger adapter 500 so that an external power can charge the separable explosion-proof chargeable battery 801 through the power management unit 20.

At the activated initiation of circuits of the energy-saving heating wearable apparatus 100, the temperature of the separable explosion-proof chargeable battery 801 is low so that the control unit 10 activates the heating unit 30 to directly heat the biological body and simultaneously heat the high specific-heat cladding layer 802.

When the circuits is activated for a period of time, the high specific-heat cladding layer 802 is heated to a high temperature to emit radiant heat. Also, the emitted radiant heat is provided to heat the biological body again to raise the temperature of the biological body. When the biological body temperature is greater than a predetermined temperature value, the control unit 10 controls the heating unit 30 to stop heating. At this time, the biological body temperature is maintained by the radiant heat emitted from the high specific-heat cladding layer 802 to achieve energy conservation.

At the activated initiation of circuits of the energy-saving heating wearable apparatus 100, the temperature of the separable explosion-proof chargeable battery 801 is low so that the control unit 10 activates the heating unit 30 to directly heat the biological body and simultaneously heat the high specific-heat cladding layer 802.

When the circuits is activated for a period of time, the high specific-heat cladding layer 802 is heated to a high temperature to emit radiant heat. Also, the emitted radiant heat is provided to heat the biological body again to raise the temperature of the biological body. When the biological body temperature is greater than a predetermined temperature value, the control unit 10 controls the heating unit 30 to stop heating. At this time, the biological body temperature is maintained by the radiant heat emitted from the high specific-heat cladding layer 802 to achieve energy conservation.

The wireless communication unit 90 is communicated with an external wireless communication apparatus, such as the smart phone 600 or the wireless control light unit 700. External climate prediction information stored in a cloud server can be downloaded by the smart phone 600 to be utilized for determining temperature controls by the control unit 10. In addition, the wireless communication unit 90 is communicated with the wireless control light unit 700 to perform a light activation mode so that the input unit 50 with buttons or switches of the wearable body 200 is used for controls of a directional light.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. An energy-saving heating wearable apparatus, installed in a wearable body, the energy-saving heating wearable apparatus comprising:
   a control unit configured to store an application program for temperature and humidity determinations;
   power supply unit configured to provide the required power to the energy-saving heating wearable apparatus;
   a power management unit electrically connected to the control unit and the power supply unit, and the power management unit configured to manage the power of the power supply unit;
   a heating unit electrically connected to the control unit and the power management unit;
   a display unit electrically connected to the control unit, and the display unit configured to display control states of the energy-saving heating wearable apparatus;
   an input unit electrically connected to the control unit, and the input unit configured to provide operation signals to the control unit;
   a temperature sensing unit electrically connected to the control unit, and the temperature sensing unit configured to sense a biological body temperature and an ambient temperature; and
   a humidity sensing unit electrically connected to the control unit, and the humidity sensing unit configured to sense a biological body humidity and an ambient humidity;
   wherein the power supply unit comprises:
   a separable plate-shaped chargeable battery; and
   a high specific-heat plate-shaped cladding layer arranged at one side of the separable plate-shaped chargeable battery, and arranged at one side of the plate-shaped heating unit;
   wherein the plate-shaped separable chargeable battery, the high specific-heat plate-shaped cladding layer, and the plate-shaped heating unit are arranged in stack inside an inner layer of the wearable body; the inner layer is corresponding to a user's finger portion;
   wherein when the biological body temperature is less than a first temperature setting value or the ambient temperature is less than a second temperature setting value, the control unit is configured to control the heating unit to continuously heat; when the biological body temperature is not less than the first temperature setting value and the ambient temperature is not less than the second temperature setting value, the control unit is configured to control the heating unit to stop heating; when the biological body humidity is less than a humidity setting value or the ambient humidity is less than the humidity setting value, the control unit is configured to control the heating unit to stop heating; when the biological body humidity is not less than the humidity setting value and the ambient humidity is not less than the humidity setting value, the control unit is configured to control the heating unit to continuously heat; and
   wherein the first temperature setting value is larger than the second temperature setting value.

2. The energy-saving heating wearable apparatus in claim 1, wherein the control unit is a microcontroller.

3. The energy-saving heating wearable apparatus in claim 1, wherein the high specific-heat cladding layer is a ceramic yarn or a nylon yarn.

4. The energy-saving heating wearable apparatus in claim 1, wherein the power management unit comprises:
a charging circuit configured to charge the power supply unit by an external power through the power management unit.

5. The energy-saving heating wearable apparatus in claim 1, wherein the heating unit is a heating layer, and the heating layer is a woven wire cloth composed of iron, steel, or copper materials, polyimide film electric heating piece, or ceramic heating piece positive temperature coefficient.

6. The energy-saving heating wearable apparatus in claim 1, wherein the display unit is an LCD display screen or an LED display screen.

7. The energy-saving heating wearable apparatus in claim 1, wherein the input unit comprises a touch switch, a time switch, and a temperature switch.

8. The energy-saving heating wearable apparatus in claim 1, wherein the temperature sensing unit comprises a biological body temperature sensor and an ambient temperature sensor.

9. The energy-saving heating wearable apparatus in claim 1, wherein the humidity sensing unit comprises a biological body humidity sensor and an ambient humidity sensor.

10. The energy-saving heating wearable apparatus in claim 1, wherein the first temperature setting value is 30 degrees.

11. The energy-saving heating wearable apparatus in claim 1, wherein the second temperature setting value is 15 degrees.

12. The energy-saving heating wearable apparatus in claim 1, wherein the humidity setting value is 60%.

13. The energy-saving heating wearable apparatus in claim 3, wherein the control unit, the power management unit, the display unit, the input unit, the temperature sensing unit, and the humidity sensing unit of the energy-saving heating wearable apparatus are integrated on a flexible printed circuit board; the flexible printed circuit board is installed inside the inner layer of the wearable body, and the temperature sensing unit and the humidity sensing unit are exposed to the ambient environment and the biological body.

14. The energy-saving heating wearable apparatus in claim 13, wherein the flexible printed circuit board further provides a USB connector; the USB connector is electrically connected to the flexible printed circuit board and the power management unit, and the USB connector has a USB adaptor and an extended transmission line, and the USB adaptor is connected at an end terminal of the extended transmission line; the USB connector is externally connected with a charger adapter.

15. The energy-saving heating wearable apparatus in claim 1, further comprising:
a wireless communication unit electrically connected to the control unit, and the wireless communication unit externally communicated with a wireless communication apparatus and configured to download climate prediction information and provide the climate prediction information to the control unit for determining temperature controls.

16. The energy-saving heating wearable apparatus in claim 15, wherein the wireless communication unit is externally coupled to a wireless control light unit and is configured to perform a light activation mode; the input unit is provided to be a switch for controls.

* * * * *